(12) United States Patent
Sommers

(10) Patent No.: US 6,620,281 B1
(45) Date of Patent: Sep. 16, 2003

(54) METHOD FOR MAKING INSULATING LABEL AND WRAP FOR BEVERAGE CONTAINER

(76) Inventor: Michael N. Sommers, 26095 El Prado, Laguna Hills, CA (US) 92653

( * ) Notice: Subject to any disclaimer, the term of this patent is extended or adjusted under 35 U.S.C. 154(b) by 257 days.

(21) Appl. No.: 09/665,933

(22) Filed: Sep. 20, 2000

Related U.S. Application Data

(62) Division of application No. 09/176,974, filed on Oct. 22, 1998, now abandoned.

(51) Int. Cl.$^7$ ................................................ B32B 31/18
(52) U.S. Cl. ........................ 156/248; 156/268; 156/277
(58) Field of Search ................................. 156/212, 248, 156/264, 268, 277, 384, 387, 443, 475; 428/202, 204, 211, 213, 215, 315, 354, 40, 914; 220/739, 903; 40/306

(56) References Cited

U.S. PATENT DOCUMENTS

| | | | |
|---|---|---|---|
| 4,039,098 A | * | 8/1977 | Stilts ........................ 220/694.1 |
| 4,073,231 A | * | 2/1978 | Roser ........................... 101/48 |
| 4,088,250 A | | 5/1978 | Schaefer |
| 4,264,657 A | | 4/1981 | Tollette |
| 4,268,567 A | | 5/1981 | Harmony |
| 4,273,816 A | | 6/1981 | Tollette |
| 4,359,160 A | | 11/1982 | Myers et al. |
| 4,383,422 A | | 5/1983 | Gordon et al. |
| 4,500,386 A | * | 2/1985 | Hoffman ..................... 156/449 |
| 4,534,391 A | | 8/1985 | Ventimiglia et al. |
| 4,832,774 A | | 5/1989 | DiFrank et al. |
| 4,933,218 A | | 6/1990 | Longobardi |
| 4,983,238 A | | 1/1991 | Yoshida et al. |
| 5,022,235 A | | 6/1991 | Grissom |
| 5,163,608 A | | 11/1992 | Block |
| 5,186,350 A | | 2/1993 | McBride |
| 5,205,473 A | | 4/1993 | Coffin, Sr. |
| 5,259,529 A | | 11/1993 | Coale |
| 5,324,153 A | | 6/1994 | Chess |
| 5,384,174 A | * | 1/1995 | Ward et al. .................. 206/440 |
| 5,385,260 A | | 1/1995 | Gatcomb |
| 5,425,497 A | | 6/1995 | Sorensen |
| 5,467,891 A | | 11/1995 | Perry |
| 5,547,124 A | | 8/1996 | Mueller |
| 5,628,453 A | | 5/1997 | MacLaughlin |
| 5,685,480 A | | 11/1997 | Choi |
| 5,713,148 A | | 2/1998 | Lovison |
| 5,713,512 A | | 2/1998 | Barrett |
| 5,716,682 A | | 2/1998 | Lovison |
| 5,724,891 A | | 3/1998 | Lovison |
| 5,762,379 A | | 6/1998 | Salmon et al. |
| 5,765,716 A | | 6/1998 | Cai et al. |
| 5,766,401 A | * | 6/1998 | Campbell et al. ............ 156/252 |
| 5,769,311 A | | 6/1998 | Morita et al. |
| 5,805,969 A | * | 9/1998 | Elsermans et al. ........... 399/321 |

* cited by examiner

*Primary Examiner*—Richard Crispino
*Assistant Examiner*—Cheryl N. Hawkins

(57) ABSTRACT

An insulating label and wrap for beverage containers of various shapes is manufactured by a continuous run process using a plurality of printing stations to provide a high quality printed image on the face of the label. The label or aftermarket beverage container wrap produced by this process comprises a multi-layered label having a layer of ink on the face of a paper stock substrate, an adhesive layer on the backside of the stock substrate holds a thin water-proof layer of foam. The printed face of the label is protected by a clear film or coating covering the ink layer. The label can be manufactured as an after-market wrap to be applied by hand by the customer and fits containers of various sizes, or as a label that is an integral part of the container as it comes from the manufacturer.

19 Claims, 2 Drawing Sheets

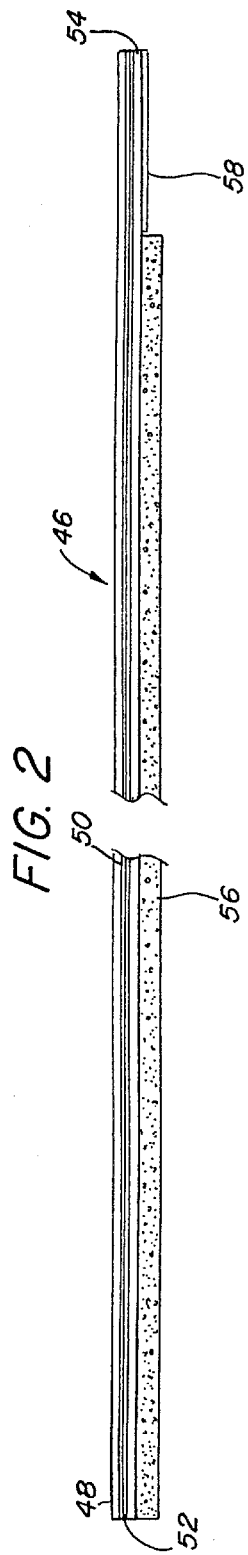
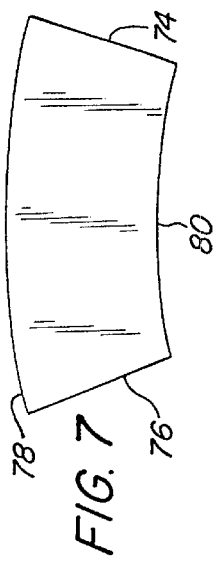
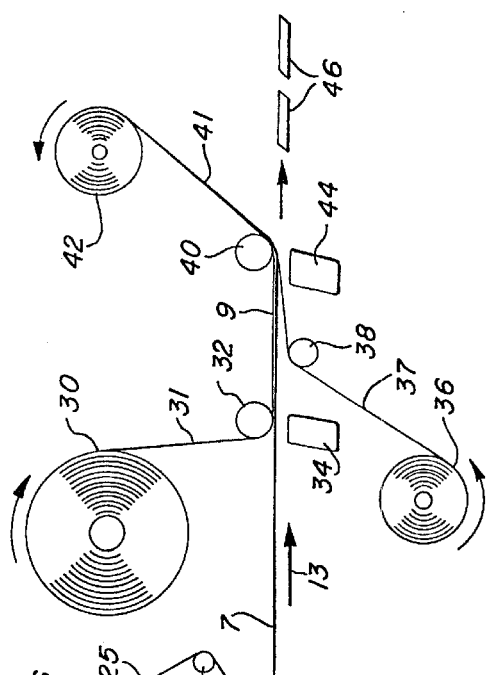
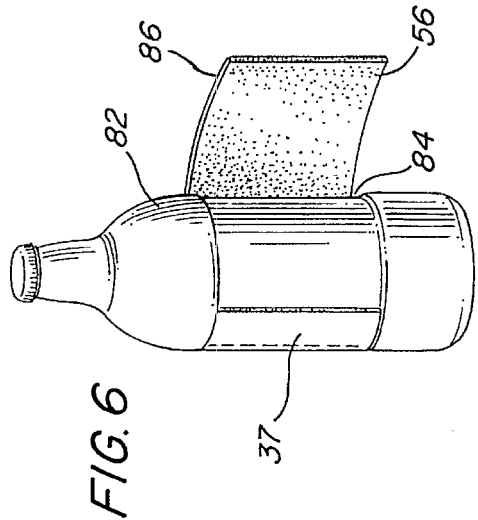
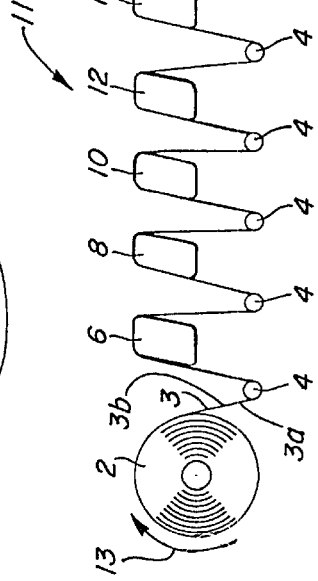

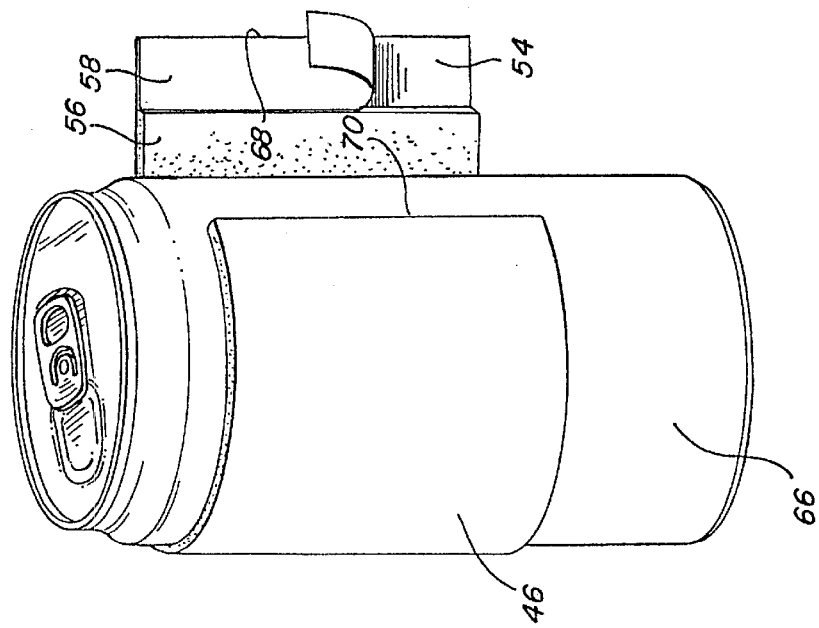
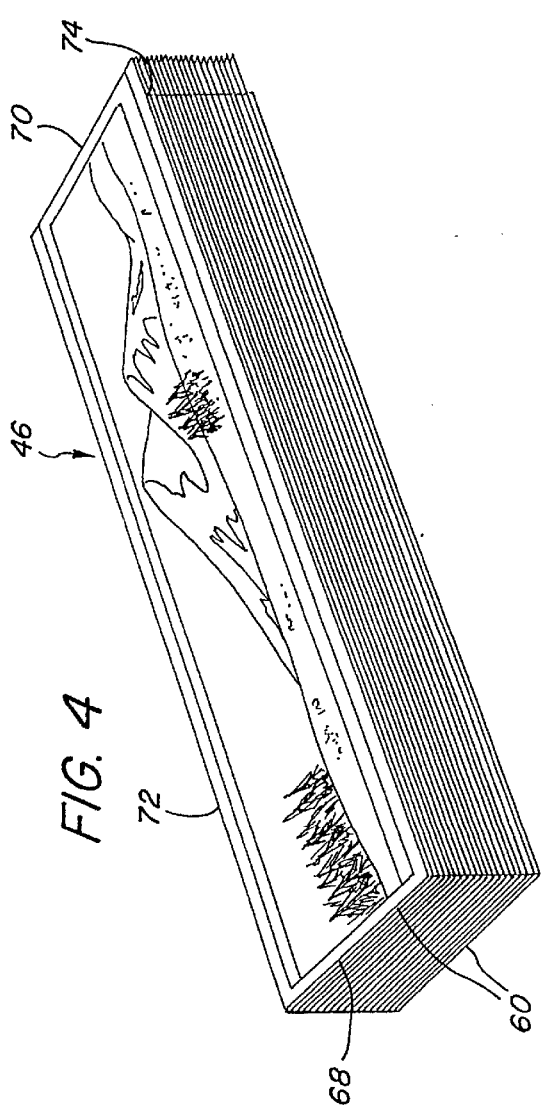

METHOD FOR MAKING INSULATING LABEL AND WRAP FOR BEVERAGE CONTAINER

CROSS-REFERENCE TO RELATED APPLICATION

This application is a divisional of application Ser. No. 09/176,974 filed Oct. 22, 1998, now abandoned, for Insulating Label And Wrap For Beverage Container And Method For Making Same.

BACKGROUND OF THE INVENTION

1. Field of the Invention

The present invention relates to an insulating apparatus and method for manufacturing and, more particularly, pertains to an insulating container label and wrap, and method of manufacturing the label and wrap.

2. Description of Related Art

It has become generally accepted in the trade that beverage container holders are insulated, disposable and supplied with graphics. For example, U.S. Pat. No. 5,425,497 describes a disposable cup holder that can be stored flat and then assembled by a user to fit around a cup whereby a first and second cut located on a first and second end of the label interlock. The resulting cup and holder combination increases the insulation value of the cup. The holder, designed to thermally insulate the hand of a user from the liquid held in the cup, is constructed of pressed paper pulp.

U.S. Pat. No. 4,534,391 shows a multi-piece hand held insulating holder for beverage cans and the like which has an interior wall spaced from the beverage can, while still positioning the can securely within the holder, and which has a recessed outer panel for receiving advertisement imprints. The insulating holder, constructed of a vinyl polymer or other suitable polymeric material, implements air space for insulating purposes. The holder, due to its size and shape, must be packaged in substantially the same form as it would be used. Therefore, a retailer, selling drinks in cups that would use the holder, would require a significant amount of space to shelve and store them for immediate use.

U.S. Pat. No. 4,983,238 discloses a method for manufacturing a thermoplastic container with a heat shrinkable label consisting of a foam polystyrene sheet whereby a printing process is applied to the sheet to produce a label. The sheet may further be laminated with a polystyrene film. The label is fixed on a beverage container during the process for manufacturing the container. In order to integrate the label with the container, sufficient force is applied to stretch it. Subsequently, a furnace provides heat to shrink the label to adhere to the container.

In contrast, the present invention permits the application of an insulating label to a pre-manufactured container while at the same time providing a label that carries high quality graphics created by the implementation of a multiple print process. The insulated label or wrap of the present invention may be an integral part of the container or re-usable. If the insulated label of the present invention is integral to the container, standard label applying techniques may be used.

SUMMARY OF THE INVENTION

The general purpose of this invention is to provide an insulating label and wrap that can be applied either as an insulating wrap on a variety of beverage containers, or may be used as the label on a container as an integral part of the container, using a manufacturing process for the label and wrap that is basically the same for both. According to the invention, this is accomplished in a simple and straightforward manner with a minimum of equipment and minimum of processing steps. The preferred method of making the labels uses modified conventional apparatus. The method of producing an after-market applied container wrap utilizes adhesive backed paper/plastic stock having a first face capable of receiving ink, and a second face lined with an adhesive covered by a release liner. Adhesive backed paper is a relatively inexpensive and commonly available product that is simple to handle and readily utilized to form the present insulated labels or wraps. The adhesive backed paper/plastic stock is unwound from a supply roll in a continuous run, passed through a plurality of separate printing stations for printing a multi-color pattern in a plurality of windows on the roll stock. The release liner is removed exposing the adhesive on the stock. A thin foam layer is brought into contact with the adhesive side of the paper stock to mate with the exposed adhesive. If a container wrap is being made, a portion of the release liner, along one edge, is left on the stock. A clear film laminate seals the printed side of the stock. A cutter cuts the resulting laminate web into a plurality of wraps or individual labels. If desired the labels may be taken up on a continuous web on a roll, rather than cut into individual labels.

The multi-layered label or wrap produced from this method comprises a layer of ink on a stock substrate, an adhesive layer holding a foam layer and a clear film or coating to seal in the ink layer. This product may be applied to a container as a permanent integral label by standard label adhesives using standard labeling techniques such as gluing, or may be used as an after-market insulating wrap for a variety of different containers by utilizing an adhesive strip at one edge of the label.

BRIEF DESCRIPTION OF THE DRAWINGS

The exact nature of this invention, as well as its general object and advantages will become apparent from the following detailed description when considered in conjunction with the accompanying drawings in which like reference numerals designate like parts throughout the figures thereof, and wherein:

FIG. 1 is a schematic of an exemplary apparatus for producing an insulating beverage label and wrap according to the method of the present invention;

FIG. 2 is a cross sectional view of a preferred label structure;

FIG. 3 is a top plan view of a label according to the present invention before being applied;

FIG. 4 is a perspective view of a stack of the labels shown in FIG. 2 and FIG. 3;

FIG. 5 is a perspective view of the label of the present invention being applied as an after-market wrap to a beverage container;

FIG. 6 is a perspective view of the label of the present invention being applied as a permanent label to a container; and FIG. 7 is a schematic top plan view of a label cut to fit a tapered container.

DETAILED DESCRIPTION OF THE PREFERRED EMBODIMENTS

The following description is provided to enable any person skilled in the art to make and use the invention and sets forth the best modes, contemplated by the inventor, for carrying out his invention. Various modifications, however, will remain readily apparent to those skilled in the art, since the generic principles of the present invention have been defined herein specifically to provide an insulating container label, an after-market container wrap, and method for making them.

The present invention provides a simple yet effective method of manufacturing a unique re-usable insulating container wrap, or an insulating label used as an integral part of the container.

The method of making the unique label of the present invention is generally illustrated in FIG. 1 as apparatus 11. A blank stock 3 carried on a roll 2 is unwound in a direction 13. Additional web transport, such as rollers 26, 30, 36 and 42 are used for carrying material used in the process, as will be explained hereinafter. Apparatus 11 initiates the process with blank stock 3, preferably an adhesive backed paper stock having a first face 3a and a second face 3b. Or, it may simply be blank stock without an adhesive backing. Blank stock 3 may be of any material that possesses the desired characteristics. As blank stock 3 is unwound from roll 2, it is fed by a plurality of rollers 4, through a plurality of printing stations 6, 8, 10, 12 and 14, that print images in different colors, resulting in multi-color images on face 3b of stock 3. A wide range of printing techniques known in the art may be used at the printing stations.

The stock 3 is turned over at station 16. Another printing station 18 prints on the back side 3a of stock 3. The front and back printed stock 5 passes around roller 20 to a score and liner remover station 28 which scores the release liner and removes the unneeded liner 25, exposing the adhesive on the stock backside. If the stock 3 used is not adhesively backed, station 28 simply adds the adhesive to the stock. On the other hand, if a wrap is being manufactured and adhesively backed stock is used, a portion of the release liner, a desired distance from the edge, is left on the backside. The unwanted release liner 25 feeds around rollers 22 and 24 to a take-up roll 26 to be disposed of as desired.

The stock with sticky side 7 up is routed in direction 13 to the next station 34. A roll 30 holds a smooth, slip resistant, waterproof, polypropylene or polyethylene foam 31. This foam material may range in thickness from about 1/64 inches to 1/8 inches. This foam web 31 is applied to the sticky side 7 of the stock via roller 32. At the time the foam web 31 and stock face 7 combine, they pass through a nip laminator station 34 which cuts the foam web 31 at a desired distance from the same edge that has the release liner, leaving a pealable release liner exposed. If the process is manufacturing labels instead of after-market wraps then no adhesive strip is provided on the back side 7 of the stock. A clear film 37 held by roll 36 is fed to the printed side of the stock and applied by a laminate roller 38. The resulting laminated web, having a foam back 9 and laminated face, passes around roller 40 and die cutting station 44 where the web stock is cut into individual labels 46. Any remaining matrix 41 is taken up by a roll 42 for later disposal.

Referring to FIG. 2, a cross sectional view of the label clearly sets forth the several layers that make up a preferred embodiment of an after-market wrap, or label 46. More specifically, top layer 48 comprises a clear film laminate or coating 37 over an ink layer 50 of various inks printed on the web stock layer 52 at stations 6, 8, 10, 12 and 14. Layer 56 is a layer of foam 31. Layer 58 is the remaining portion of the release liner 25 for adhesive layer 54 after the rest of the liner 25 was cut away at station 28. Layer 52 of label 46 provides a smooth painting surface for exceptional high quality graphics with a high gloss finish. Such exceptional high quality graphics combined with artistic advertisement render the container label or wrap 46 a potential collectible.

Label 46 is shown in FIG. 3, as an elongated rectangular band having distal ends 68, 70. The label 46 has a width defined by top 72 and bottom 74 which are rectangular in shape for cylindrical receptacles. If desired, the label may be shaped to fit around tapered receptacles by curving the top 78 and bottom 80 (FIG. 7) and cutting the ends 76, 74 at an angle, as required.

As shown in FIG. 4, lightweight label or container wrap 46 may be easily stacked and stored without requiring significant shelf or storage space. Due to its collapsible and sturdy nature, label or wrap 46 can be stored flat for subsequent use.

A container may come from the manufacturer with a label according to the present invention permanently attached. This pre-application may be accomplished a variety of ways. For example, a continuous roll feed with a pressure sensitive adhesive backing, or a cut and stack method whereby individual labels are precut and applied to a beverage container 82 (FIG. 6) with either hot or cold glue on the foam back, or roll-fed labels 46 may be simultaneously glued onto the container and cut to size while being applied by the labeling machine. Whichever process of label application is used, the result is label 86 is capable of being applied at high speeds to containers to become an integral part of the container 82. By utilizing a polypropylene or polyethylene foam 31 on one side and a water-proof clear film laminate 37 on the other, the waterproof exterior of label 86 provides superior durability and does not allow inks on the label 86 to run when sitting in a cooler of ice.

Referring to FIG. 5, an after-market label or wrap 46 is shown being applied to a cylindrical beverage container 66. Although the beverage container is typically an aluminum can it could also be a glass or plastic bottle. The adjustability of label 46 facilitated by adhesive strip 54 enables a snug fit on containers of various diameters. Label 46 is shown being applied to a cylindrical container in FIG. 5. It should be understood that a label as shown in FIG. 7 could be applied just as easily to a tapered container, in the same manner.

Label 46 can be applied to any shape of container by wrapping it around the container 66, removing the peel layer 58, exposing adhesive strip 54, and attaching the first end 68 with the adhesive strip 54 to the second end 70. The resulting wrap 46 forms a continuous loop around the container 66, insulating the beverage within and protecting the hand holding the container from the hot or cold of the beverage. For labels 86 pre-applied by the manufacturer as an integral part of the container 82, the label 86 with the back side of foam layer 56 next to surface 84 of the container would be permanently attached to the container 82 by well known industry methods.

While the invention has been shown and described in, what is presently conceived to be, the most practical and preferred embodiment, it will be apparent to those of ordinary skill in the art that many modifications may be made, thereof, within the scope of the invention, which scope is to be accorded the broadest interpretation of the appended claims so as to encompass all equivalent methods, apparatus and resulting products.

The features of the present invention, which are believed to be novel, are set forth with particularity in the appended claims.

What is claimed is:

1. A method of manufacturing an insulating wrap for a container, the steps of the method comprising:

passing a continuous strip of printable stock having a front side and a back side, with a pressure sensitive adhesive layer on its backside, covered with a release liner, through at least one printing station to print indicia on a portion of the stock at the printing station;

scoring the release liner along the width of the stock to define a first release liner section and an edge strip along one edge of the insulating wrap;

peeling the first release liner section away from the backside of the stock substrate to expose a first adhesive section of stock;

applying a thin foam web, the same width as the printed stock, to the first adhesive section of stock to be held by the pressure sensitive adhesive; and applying a thin film over the front side of the stock sealing the printed indicia thereon.

2. The method of claim 1 further comprising the step of trimming the continuous print stock into separate wraps.

3. The method of claim 1 wherein said passing step comprises passing the stock through a plurality of print stations.

4. The method of claim 3 where said passing step comprises passing the stock substrate through five print stations.

5. The method of claim 4 further comprising, after the passing step, the steps of inverting the stock and passing the inverted stock through at least one print station.

6. The method of claim 1 further comprising:

after the passing step, the step of inverting the stock and passing the inverted stock through at least one print station.

7. The method of claim 6 further comprising, after the inverted stock print step, the step of scoring the release liner on the stock.

8. The method of claim 1 wherein two ends of the wrap may be joined by the adhesive edge strip.

9. The method of claim 8 further comprising the step of trimming the continuous print stock into separate labels.

10. The method of claim 9 wherein said passing step comprises passing the stock through five print stations.

11. The method of claim 1 wherein said passing step comprises passing the stock substrate through five print stations.

12. A method of manufacturing an insulating wrap for a container, the steps of the method comprising:

passing a continuous strip of printable stock having a front side and a back side through at least one printing station to print indicia on a portion of the stock at the printing station;

applying an adhesive to the backside of the stock;

applying a thin foam web, the same width as the printed stock to a first section of the backside of the stock to be held by the adhesive while leaving a second section of the backside of the stock as an adhesive edge strip; and applying a thin film over the front side of the stock sealing the printed indicia thereon.

13. The method of claim 12 further comprising the step of trimming the continuous print stock into separate wraps.

14. The method of claim 12 wherein said passing step comprises passing the stock through a plurality of print stations.

15. The method of claim 14 further comprising, after the passing step, the steps of inverting the stock and passing the inverted stock through at least one print station.

16. A method of manufacturing an insulating label for a container, the steps of the method comprising:

passing a continuous strip of printable stock having a front side and a back side through at least one printing station to print indicia on a portion of the stock;

applying an adhesive to the backside of the stock;

applying a thin foam web, the same width as the printed stock, to a first section of the backside of the stock to be held by the adhesive while leaving a second section of the backside of the stock as an adhesive edge strip; and applying a thin film over the front side of the stock sealing the printed indicia thereon.

17. The method of claim 16 wherein said passing step comprises passing the stock through a plurality of print stations.

18. The method of claim 16 where said passing step comprises passing the stock through five print stations.

19. The method of claim 16 further comprising the step of trimming the continuous print stock into separate wraps, wherein two ends of a wrap may be joined by the adhesive edge strip.

* * * * *